(12) United States Patent
Xie et al.

(10) Patent No.: US 12,484,027 B2
(45) Date of Patent: Nov. 25, 2025

(54) RANDOM ACCESS RESOURCE SELECTION METHOD AND RELATED APPARATUS

(71) Applicant: HUAWEI TECHNOLOGIES CO., LTD., Guangdong (CN)

(72) Inventors: Zonghui Xie, Shenzhen (CN); Hong Wang, Beijing (CN); Lei Chen, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 403 days.

(21) Appl. No.: 18/158,794

(22) Filed: Jan. 24, 2023

(65) Prior Publication Data

US 2023/0164746 A1    May 25, 2023

Related U.S. Application Data

(63) Continuation of application No. PCT/CN2021/093008, filed on May 11, 2021.

(30) Foreign Application Priority Data

Jul. 28, 2020   (CN) .......................... 202010736977.5

(51) Int. Cl.
*H04W 72/02* (2009.01)
*H04W 72/0453* (2023.01)
(Continued)

(52) U.S. Cl.
CPC ....... *H04W 72/02* (2013.01); *H04W 72/0453* (2013.01); *H04W 74/0833* (2013.01); *H04W 74/0836* (2024.01); *H04W 74/0838* (2024.01)

(58) Field of Classification Search
CPC ............. H04W 72/02; H04W 72/0453; H04W 74/006; H04W 74/0833; H04W 4/70;
(Continued)

(56) References Cited

U.S. PATENT DOCUMENTS

2018/0242365 A1    8/2018  Rathonyi et al.
2020/0187256 A1*   6/2020  Lim ..................... H04W 72/23
(Continued)

FOREIGN PATENT DOCUMENTS

CN         107734687 A        2/2018
CN         108289329 A        7/2018
(Continued)

OTHER PUBLICATIONS

Extended European Search Report in European Appln No. 21849766.7, dated Dec. 7, 2023, 8 pages.
(Continued)

*Primary Examiner* — Yu-Wen Chang
(74) *Attorney, Agent, or Firm* — Fish & Richardson P.C.

(57) ABSTRACT

This application discloses random access resource selection methods and apparatuses. In an implementation, a method includes obtaining reference information, and in response to determining that a first parameter and the reference information satisfies a preset condition, selecting a primary frequency domain resource or a non-primary frequency domain resource based on a first probability corresponding to the primary frequency domain resource and a second probability corresponding to the non-primary frequency domain resource.

20 Claims, 7 Drawing Sheets

(51) Int. Cl.
*H04W 74/0833* (2024.01)
*H04W 74/0836* (2024.01)
*H04W 74/0838* (2024.01)

(58) Field of Classification Search
CPC ............... H04W 4/90; H04W 74/0836; H04W 74/0838; H04W 72/23
See application file for complete search history.

(56) References Cited

U.S. PATENT DOCUMENTS

| | | | | |
|---|---|---|---|---|
| 2020/0314910 | A1* | 10/2020 | Höglund | H04L 1/1642 |
| 2020/0389903 | A1* | 12/2020 | Shreevastav | G16Y 20/30 |
| 2021/0105813 | A1* | 4/2021 | Lee | H04W 74/0833 |
| 2021/0136826 | A1* | 5/2021 | Chang | H04W 74/0833 |
| 2021/0352688 | A1* | 11/2021 | Luo | H04W 72/1268 |
| 2023/0029520 | A1* | 2/2023 | Lin | H04W 74/0833 |

FOREIGN PATENT DOCUMENTS

| | | |
|---|---|---|
| CN | 110856267 A | 2/2020 |
| EP | 3525535 A1 | 8/2019 |

OTHER PUBLICATIONS

CATT, "Report of email discussion [95bis#25] [LTE/NB-IoT] RACH on non-anchor," 3GPP TSG-RAN WG2 Meeting #96, R2-168156, Reno, USA, Nov. 14-18, 2016, 30 pages.

Ericsson, "Summary of email discussion [95#41][eNB-IoTenh] Paging open issues," 3GPP TSG-RAN WG2 #95bis, R2-166278, Kaohsiung, Taiwan, Oct. 10-14, 2016, 14 pages.

CATT, "Summary of email discussion [94#40] [eNB-IoTenh] RACH on non-anchor carrier," 3GPP TSG-RAN WG2 Meeting #95bis, Kaohsiung, R2-166210, Oct. 10-14, 2016, 21 pages.

3GPP TS 38.300 V16.2.0, "3rd Generation Partnership Project; Technical Specification Group Radio Access Network; NR; NR and NG-RAN Overall Description; Stage 2 (Release 16)," Jul. 2020, 148 pages.

3GPP TS 36.300 V16.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Jul. 2020, 390 pages.

International Search Report and Written Opinion in International Appln. No. PCT/CN2021/093008, mailed on Aug. 12, 2021, 13 pages (with English translation).

* cited by examiner

RANDOM ACCESS RESOURCE SELECTION METHOD AND RELATED APPARATUS

CROSS-REFERENCE TO RELATED APPLICATIONS

This application is a continuation of International Application No. PCT/CN2021/093008, filed on May 11, 2021, which claims priority to Chinese Patent Application No. 202010736977.5, filed on Jul. 28, 2020.The disclosures of the aforementioned applications are hereby incorporated by reference in their entireties.

TECHNICAL FIELD

Embodiments of this application relate to the field of communications technologies, and in particular, to a random access resource selection method and a related apparatus.

BACKGROUND

Random access is a procedure of establishing a radio link between a terminal device and a network device. After random access between the terminal device and the network device is completed, the terminal device and the network device can normally communicate with each other. In the random access procedure, the terminal device needs to select a physical random access channel (physical random access channel, PRACH) resource, to complete the random access.

NB-IoT and eMTC terminal devices are characterized by low complexity, low costs, low power consumption, and low bandwidth, and are applicable to a wide range of Internet of things scenarios, for example, a smart water meter, a smart electricity meter, a smart household, and a smart city. Currently, a massive machine type communications (Massive Machine Type Communications, mMTC) scenario defined in 5G is under wide-ranging discussion and attention. The massive machine type communications scenario emerges to adapt to development of 5G, and needs to have the characteristics of the NB-IoT and eMTC terminal devices.

To meet a requirement of providing wireless services for a large quantity of devices, this type of device supports selecting an anchor carrier as a frequency domain resource for transmitting an NPRACH to initiate random access, and also supports selecting a non-anchor carrier as a frequency domain resource for transmitting an NPRACH to initiate random access. However, for random access triggered by different events, a corresponding NPRACH resource is selected according to a same rule, and consequently, a resource of relatively good quality may not be selected for random access triggered by some emergencies, affecting access timeliness.

SUMMARY

Embodiments of this application provide a random access resource selection method and a related apparatus, to resolve a current technical problem of relatively poor random access timeliness.

According to a first aspect, an embodiment of this application provides a random access resource selection method, including: A terminal device obtains reference information; and when determining that a first parameter and the reference information meet a preset condition, selects a primary frequency domain resource or a non-primary frequency domain resource based on a first probability and a second probability, to initiate random access. There is a correspondence between the first probability and the primary frequency domain resource, and there is a correspondence between the second probability and the non-primary frequency domain resource. In this embodiment of this application, the primary frequency domain resource and the non-primary frequency domain resource are selected by using different probabilities. Generally, quality of the primary frequency domain resource is relatively good. Therefore, when a probability corresponding to the primary frequency domain resource is larger, for random access triggered by some emergencies, there is a larger probability that the primary frequency domain resource is selected, and the terminal device can select a resource with relatively good quality, so that a current technical problem of relatively poor random access timeliness is resolved.

With reference to the first aspect, in an implementation of this embodiment of this application, the primary frequency domain resource is an initial bandwidth part, and the non-primary frequency domain resource is a non-initial bandwidth part; or the primary frequency domain resource is an anchor carrier, and the non-primary frequency domain resource is a non-anchor carrier; or the primary frequency domain resource is a first narrowband, and the non-primary frequency domain resource is a non-first narrowband.

With reference to the first aspect, in an implementation of this embodiment of this application, the reference information includes an emergency set, or the reference information includes a preset parameter range.

With reference to the first aspect, in an implementation of this embodiment of this application, the first parameter includes a type of an event that currently triggers random access, and the preset condition includes: the type of the event that triggers random access belongs to the emergency set.

With reference to the first aspect, in an implementation of this embodiment of this application, the first parameter includes a delay requirement of an arrived service, and the preset condition includes: the delay requirement of the arrived service falls within the preset parameter range.

With reference to the first aspect, in an implementation of this embodiment of this application, the first parameter includes a priority requirement of an arrived service, and the preset condition includes: the priority requirement of the arrived service falls within the preset parameter range.

With reference to the first aspect, in an implementation of this embodiment of this application, the emergency set includes at least one of the following: initial access from a radio resource control RRC idle mode (Initial access from RRC_IDLE), RRC connection re-establishment (RRC Connection Re-establishment procedure), uplink or downlink data arrival during an RRC connected mode when a downlink synchronization status is "non-synchronized" (UL data arrival during RRC_CONNECTED when UL synchronisation status is "non-synchronised), downlink data arrival during the RRC connected mode when there are no physical uplink control channels PUCCHs for a scheduling request available (UL data arrival during RRC_CONNECTED when there are no PUCCH resources for SR available), a scheduling request failure (scheduling request failure), a transition from an RRC inactive mode (Transition from RRC_INACTIVE), downlink data arrival when an uplink synchronization status is "non-synchronized" (DL data arrival during RRC_CONNECTED when UL synchronisation status is "non-synchronised"), synchronous reconfiguration (Request by RRC upon synchronous reconfiguration), establishment of time alignment for a secondary timing advance group (Secondary Timing Advance Group), a request for other system information (other SI), and beam failure recovery (beam failure recovery).

With reference to the first aspect, in an implementation of this embodiment of this application, before the primary frequency domain resource or the non-primary frequency domain resource is selected based on the first probability and the second probability, to initiate random access, the method further includes: obtaining a measurement result of each frequency resource; and determining the first probability and the second probability based on the measurement result. With reference to the first aspect, in an implementation of this embodiment of this application, the method further includes: The terminal device receives capability indication information from an access network device. The capability indication information is used to indicate the terminal device to select, when the terminal device determines that the first parameter and the reference information meet the preset condition, the primary frequency domain resource or the non-primary frequency domain resource based on the first probability and the second probability, to initiate random access.

With reference to the first aspect, in an implementation of this embodiment of this application, before the primary frequency domain resource or the non-primary frequency domain resource is selected based on the first probability and the second probability, to initiate random access, the method further includes: determining, depending on whether the first parameter falls within the preset parameter range, a service type to which a current service belongs; and determining the first probability and the second probability based on the service type.

With reference to the first aspect, in an implementation of this embodiment of this application, the first probability is a preset probability P, and a formula for calculating the second probability is $(1-P)*q(i)/q$, where $q(i)$ is relative quality of the $i^{th}$ non-primary frequency domain resource, q is a sum of relative quality of all non-primary frequency domain resources, and i is an integer greater than or equal to 1.

With reference to the first aspect, in an implementation of this embodiment of this application, both the first probability and the second probability are $q(i)/q$, where $q(i)$ is relative quality of the $i^{th}$ primary frequency domain resource or non-primary frequency domain resource, q is a sum of all relative quality, and i is an integer greater than or equal to 1.

With reference to the first aspect, in an implementation of this embodiment of this application, the relative quality is one of reference signal received power RSRP, reference signal received quality RSRQ, a signal to interference plus noise ratio SINR, and a signal-to-noise ratio SNR.

With reference to the first aspect, in an implementation of this embodiment of this application, the reference signal includes one or more of a cell-specific reference signal CRS, a synchronization signal block SSB, and a channel state information reference signal CSI-RS.

According to another aspect, an embodiment of this application provides another random access resource selection method. The method includes: A network device sends capability indication information to a terminal device. The capability indication information is used to indicate the terminal device to select, when the terminal device determines that a first parameter and reference information meet a preset condition, a primary frequency domain resource or a non-primary frequency domain resource based on a first probability and a second probability, to initiate random access. In addition, the network device may further send the reference information to the terminal device. The reference information includes an emergency set, or the reference information includes a preset parameter range.

According to a second aspect, an embodiment of this application provides a communications apparatus, including: an obtaining module, configured to obtain reference information; and a processing module, configured to: when it is determined that a first parameter and the reference information meet a preset condition, select a primary frequency domain resource or a non-primary frequency domain resource based on a first probability and a second probability, to initiate random access. There is a correspondence between the first probability and the primary frequency domain resource, and there is a correspondence between the second probability and the non-primary frequency domain resource.

With reference to the second aspect, in an implementation of this embodiment of this application, the primary frequency domain resource is an initial bandwidth part, and the non-primary frequency domain resource is a non-initial bandwidth part; or the primary frequency domain resource is an anchor carrier, and the non-primary frequency domain resource is a non-anchor carrier; or the primary frequency domain resource is a first narrowband, and the non-primary frequency domain resource is a non-first narrowband.

With reference to the second aspect, in an implementation of this embodiment of this application, the reference information includes an emergency set, or the reference information includes a preset parameter range.

With reference to the second aspect, in an implementation of this embodiment of this application, the first parameter includes a type of an event that currently triggers random access, and the preset condition includes: the type of the event that triggers random access belongs to the emergency set.

With reference to the second aspect, in an implementation of this embodiment of this application, the first parameter includes a delay requirement of an arrived service, and the preset condition includes: the delay requirement of the arrived service falls within the preset parameter range.

With reference to the second aspect, in an implementation of this embodiment of this application, the first parameter includes a priority requirement of an arrived service, and the preset condition includes: the priority requirement of the arrived service falls within the preset parameter range. With reference to the second aspect, in an implementation of this embodiment of this application, the emergency set includes at least one of the following: initial access from a radio resource control RRC idle mode, RRC connection re-establishment, uplink or downlink data arrival during an RRC connected mode when a downlink synchronization status is "non-synchronized", downlink data arrival during the RRC connected mode when there are no physical uplink control channels PUCCHs for a scheduling request available, a scheduling request failure, a transition from an RRC inactive mode, downlink data arrival when an uplink synchronization status is "non-synchronized", synchronous reconfiguration, establishment of time alignment for a timing advance group, a request for other system information, and beam failure recovery.

With reference to the second aspect, in an implementation of this embodiment of this application, before the primary frequency domain resource or the non-primary frequency domain resource is selected based on the first probability and the second probability, to initiate random access, the method further includes: obtaining a measurement result of each frequency resource; and determining the first probability and the second probability based on the measurement result.

With reference to the second aspect, in an implementation of this embodiment of this application, the processing module is further configured to: determine, depending on whether the first parameter falls within the preset parameter range, a service type to which a current service belongs; and determine the first probability and the second probability based on the service type.

With reference to the second aspect, in an implementation of this embodiment of this application, the processing apparatus is further configured to: obtain a measurement result of each frequency resource; and determine the first probability and the second probability based on the measurement result.

With reference to the second aspect, in an implementation of this embodiment of this application, the first probability is a preset probability P, and a formula for calculating the second probability is $(1-P)*q(i)/q$, where $q(i)$ is relative quality of the $i^{th}$ non-primary frequency domain resource, $q$ is a sum of relative quality of all non-primary frequency domain resources, and i is an integer greater than or equal to 1.

With reference to the second aspect, in an implementation of this embodiment of this application, both the first probability and the second probability are $q(i)/q$, where $q(i)$ is relative quality of the $i^{th}$ primary frequency domain resource or non-primary frequency domain resource, q is a sum of all relative quality, and i is an integer greater than or equal to 1.

With reference to the second aspect, in an implementation of this embodiment of this application, the relative quality is one of reference signal received power RSRP, reference signal received quality RSRQ, a signal to interference plus noise ratio SNR, and a signal-to-noise ratio SNR.

With reference to the second aspect, in an implementation of this embodiment of this application, the reference signal includes one or more of a cell-specific reference signal CRS, a synchronization signal block SSB, and a channel state information reference signal CSI-RS.

According to a third aspect, an embodiment of this application provides a terminal device, including a memory, a processor, and a program that is stored in the memory and that can run on the processor. The processor implements the method according to the first aspect when executing the program.

According to a fourth aspect, an embodiment of this application provides a computer-readable storage medium. When instructions run on a computer apparatus, the computer apparatus performs the method according to the first aspect.

DESCRIPTION OF EMBODIMENTS

Figure 1:
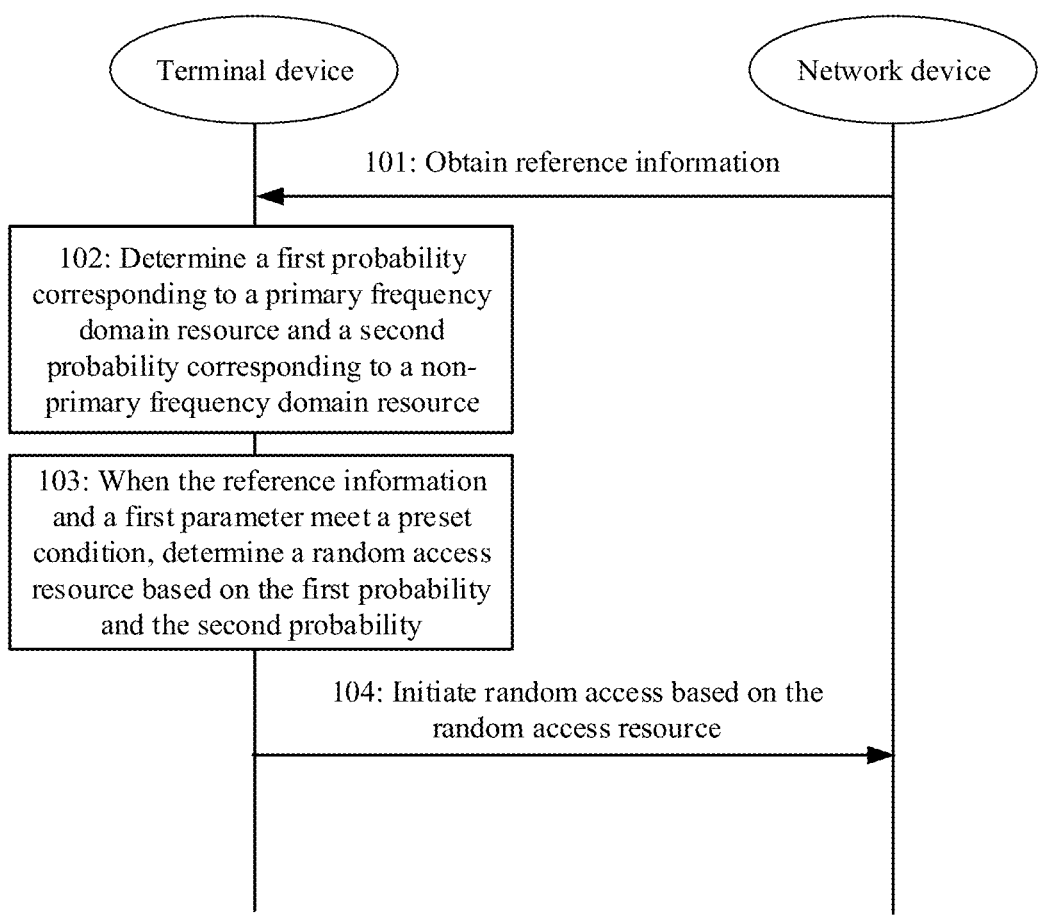
FIG. 1 is a schematic diagram of a random access resource selection method according to an embodiment of this application.

Embodiments of this application provide a random access resource selection method and a related apparatus, to resolve a current technical problem of relatively poor random access timeliness.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of this application described herein can be implemented in other orders than the order illustrated or described herein. In addition, the terms "include" and "correspond to" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

In embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "an example" or "for example" or the like is intended to present a relative concept in a specific manner.

To make descriptions of the following embodiments clear and concise, related technologies are first briefly described.

Random access (random access, RA) may include a procedure of sending a random access preamble by a terminal device and establishing a basic signaling connection between the terminal device and a network device. Generally, random access may include four-step random access and two-step random access.

Four-step random access includes the following four procedures:
1. A terminal device sends a random access preamble. This procedure is usually referred to as a procedure in which the terminal device sends a MSG 1.
2. A network device sends a random access response message. This procedure is usually referred to as a procedure in which the network device sends a MSG 2.
3. The terminal device sends a radio resource control (radio resource control, RRC) connection request message. This procedure is usually referred to as a procedure in which the terminal device sends a MSG 3.
4. The network device sends an RRC connection establishment message. This procedure is usually referred to as a procedure in which the network device sends a MSG 4.

Two-step random access includes the following two procedures:
1. A terminal device sends a random access preamble and an RRC connection request message. This procedure is usually referred to as a procedure in which the terminal device sends a MSG A.

2. A network device sends an RRC connection establishment message. This procedure is usually referred to as a procedure in which the network device sends a MSG B.

The technical solutions of embodiments of this application may be applied to a scenario of four-step random access, and may also be applied to a scenario of two-step random access. This is not specifically limited herein.

In a procedure in which the terminal device implements random access, the terminal device needs to select a proper random access resource, to send the random access preamble and the RRC connection request message. The random access resource is a resource that the terminal device needs to use when initiating random access. Generally, a procedure in which the terminal device selects a random access resource may be as follows: The terminal device first selects an anchor carrier (anchor carrier) or a non-anchor carrier (non-anchor carrier), and then selects a specific PRACH resource. When a plurality of carriers provide PRACH resources with a same coverage level, the terminal device randomly selects one of the carriers as a PRACH resource. Selection probabilities are as follows: A selection probability of a PRACH resource of a given anchor carrier with an enhanced coverage level nprach-ProbabilityAnchor is provided in a corresponding field in nprach-ProbabilityAnchorList. Selection probabilities of PRACH resources of all non-anchor carriers are equal, and a probability of selecting a PRACH resource from a given non-anchor carrier is (1−nprach-ProbabilityAnchor)/(quantity of non-anchor NPRACH resources).

Currently, when the terminal device selects a random access resource, for random access triggered by different events, corresponding random access resources are selected according to a same rule. Consequently, resources with relatively good quality may not be selected from random access triggered by some emergencies, affecting random timeliness. In view of this, an embodiment of this application provides a random access resource selection method. As shown in FIG. 1, the random access resource selection method includes the following steps.

101: A terminal device obtains reference information.

In some embodiments, the terminal device may first obtain the reference information, and then determine whether the reference information and a first parameter meet a preset condition. When the reference information and the first parameter meet the preset condition, the terminal device may perform step 103. In this embodiment of this application, the first parameter may be a type of an event that currently triggers random access. The reference information may include an emergency set. That the reference information and the first parameter meet the preset condition may be that the event that triggers random access belongs to the emergency set. Alternatively, the first parameter may be any parameter, for example, a delay requirement of an arrived service or a priority requirement of an arrived service, that can be obtained by the terminal device. This is not limited in this embodiment of this application. The reference information may include a corresponding preset parameter range, for example, a parameter range corresponding to the delay requirement of the arrived service. This is not limited in this embodiment of this application. That the reference information and the first parameter meet the preset condition may be that the delay requirement of the arrived service falls within the preset parameter range. For details, refer to detailed descriptions in subsequent embodiments. Details are not described herein again.

In some embodiments, the terminal device may determine, by using capability indication information, whether to perform the random access resource selection method provided in this embodiment of this application. For example, if capability indication information received by the terminal device from an access network device is 1, the terminal device may perform the random access resource selection method provided in this embodiment of this application, and select a primary frequency domain resource or a non-primary frequency domain resource based on a first probability and a second probability, to initiate random access. If capability indication information received by the terminal device from an access network device is 0, the terminal device does not perform the random access resource selection method provided in this embodiment of this application.

102: The terminal device determines the first probability corresponding to the primary frequency domain resource and the second probability corresponding to the non-primary frequency domain resource.

In this embodiment of this application, the first probability and the second probability may be delivered by a network device, for example, the first probability and the second probability are carried in system information and delivered; or the first probability and the second probability may be agreed on in a protocol. In other embodiments, the terminal device may determine the first probability and the second probability based on a formula. The formula may be agreed upon in a protocol. The terminal device may obtain a related parameter from the terminal device or from communication with the network device, and then determine the first probability and the second probability based on the related parameter and the formula. In actual application, the first probability and the second probability may be determined in another manner. For example, the first probability and/or the second probability or a related formula for calculating the first probability and/or the second probability is prestored in a storage medium of the terminal device. This is not limited in this embodiment of this application.

In some embodiments, in 5G NR (5G New Radio), the primary frequency domain resource may be an initial bandwidth part (initial BWP, BWP: bandwidth part bandwidth part), and the non-primary frequency domain resource may be a non-initial bandwidth part, namely, a BWP other than the initial BWP in NR.

Figure 2:
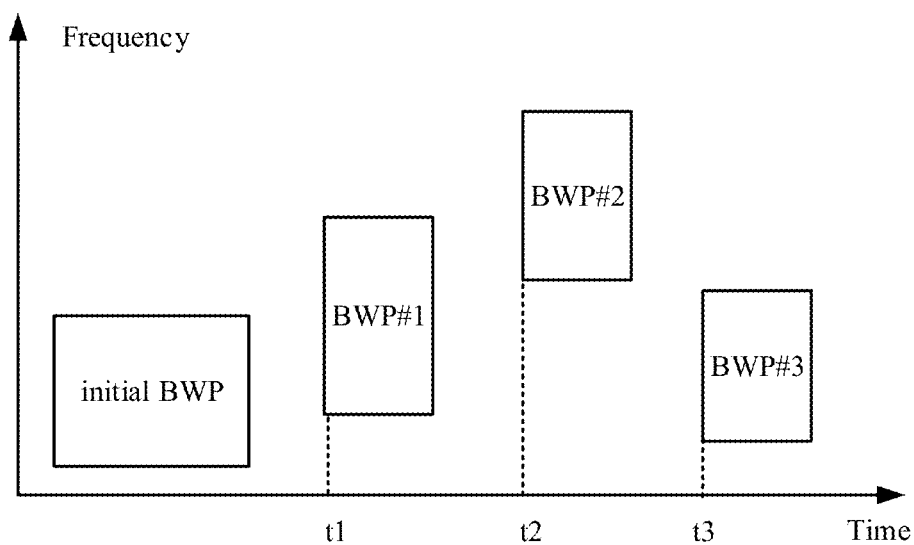
FIG. 2 is a schematic diagram of a BWP according to an embodiment of this application.

In a 5G communications system, the 5G communications system supports configuration of a bandwidth part (BandWidth Part, BWP), and a base station may flexibly adjust bandwidth based on a service data volume of a terminal device (UE), to reduce power consumption of the terminal device. Currently, in an RRC idle mode, the base station configures, by using system information, an initial bandwidth part (initial BWP) for initial access performed by the terminal device. When the terminal device enters an RRC connected mode, the base station may configure a plurality of dedicated bandwidth parts (dedicated BWP) for the UE, and the base station may activate the dedicated BWP of the UE by using a dynamic indication. FIG. 2 is a schematic diagram of a BWP according to an embodiment of this application. The UE accesses the base station by using the initial BWP, and enters the RRC connected mode. Then the base station configures three dedicated BWPs, namely, BWP #1, BWP #2, and BWP #3, for the UE.

In the existing 5G communications system, the initial BWP may be 5 MHz, 10 MHz, 15 MHz, or 20 MHz. The dedicated BWP may be 5 MHz, 10 MHz, 15 MHz, 20 MHz, 25 MHz, 30 MHz, 40 MHz, 50 MHz, 60 MHz, 80 MHz, or 100 MHz. When a large quantity of UEs perform access, the initial BWP may be unable to support a case in which the large quantity of UEs simultaneously initiate random access, causing the initial BWP to be overloaded. Therefore, in the random access resource selection method provided in this embodiment of this application, BWP selection can be optimized, so that a BWP with relatively good quality can be selected for random access triggered by an emergency.

In some embodiments, on the narrowband Internet of things (Narrow Band Internet of Things, NB-IoT), the primary frequency domain resource may be an anchor carrier (anchor carrier), and the non-primary frequency domain resource may be a non-anchor carrier (non-anchor carrier).

In some embodiments, in machine type communication (Machine Type Communication, MTC) or enhanced MTC (Enhanced MTC, eMTC), the primary frequency domain resource may be a first narrowband, and the non-primary frequency domain resource may be another narrowband, namely, a narrowband other than the first narrowband in narrowband information.

It may be understood that there may be no sequential relationship between step 101 and step 102. When it is determined that the parameter in step 101 needs to be used for determining the first probability and the second probability, step 102 is usually performed after step 101.

103: When the reference information and the first parameter meet the preset condition, the terminal device determines a random access resource based on the first probability and the second probability.

When the reference information and the first parameter meet the preset condition, the terminal device may perform step 103. In this embodiment of this application, the first parameter may be a type of an event that currently triggers random access. The reference information may include an emergency set. That the reference information and the first parameter meet the preset condition may be that the event that triggers random access belongs to the emergency set. Alternatively, the first parameter may be any parameter, for example, a delay requirement of an arrived service or a priority requirement of an arrived service, that can be obtained by the terminal device. This is not limited in this embodiment of this application. The reference information may include a corresponding preset parameter range, for example, a parameter range corresponding to the delay requirement of the arrived service. This is not limited in this embodiment of this application. That the reference information and the first parameter meet the preset condition may be that the delay requirement of the arrived service falls within the preset parameter range. For details, refer to detailed descriptions in subsequent embodiments. Details are not described herein again.

In this embodiment of this application, the random access resource may be BWP information, carrier information, or narrowband information. In actual application, the random access resource may be alternatively of another type. This is not limited in this embodiment of this application. It may be understood that the random access resource is one or more resources selected from primary frequency domain resources or non-primary frequency domain resources in step 102.

In this embodiment of this application, the terminal device may select and determine the random access resource from the primary frequency domain resource and the non-primary frequency domain resource by using a probability selection algorithm, the first probability, and the second probability. The probability selection algorithm is not limited in this embodiment of this application.

For example, the first probability is 1 (in other words, a probability of the primary frequency domain resource is 100%), and the second probability is 0. The terminal device determines and selects the primary frequency domain resource as the random access resource based on the first probability and the second probability. If the primary frequency domain resource is an initial BWP, the terminal device selects the initial BWP as the random access resource.

For example, if the first probability is 0.7 (in other words, a probability of the primary frequency domain resource is 70%), and there are 15 non-primary frequency domain resources, a second probability of each non-primary frequency domain resource is 0.3/15=0.02. The terminal device may select and determine the random access resource from the primary frequency domain resource and the non-primary frequency domain resources based on a case in which the probability of the primary frequency domain resource is 70%. In this case, a probability that the primary frequency domain resource is selected is relatively large, and the terminal device prefers to select the primary frequency domain resource with higher reliability, and is prone to select a resource with relatively good quality, so that a current technical problem of relatively poor timeliness of random access triggered by an emergency is resolved.

104: The terminal device performs random access based on the random access resource.

In this embodiment of this application, the terminal device may perform random access based on the random access resource. A random access procedure is similar to the foregoing four-step random access and two-step random access, and details are not described herein again. Specifically, the terminal device may send a random access preamble or an RRC connection establishment request message based on frequency domain/a carrier/a narrowband corresponding to the random access resource. Details are not described in this embodiment of this application.

The technical solutions of embodiments of this application may be applied to various communications systems, for example, a code division multiple access (code division multiple access, CDMA) system, a time division multiple access (time division multiple access, TDMA) system, a frequency division multiple access (frequency division multiple access, FDMA) system, an orthogonal frequency division multiple access (orthogonal frequency-division multiple access, OFDMA) system, a single carrier frequency division multiple access (single carrier FDMA, SC-FDMA) system, and another system. The terms "system" and "network" can be interchanged. For example, the system is a communications system such as a 3GPP long term evolution (long term evolution, LTE) system, various versions evolved based on LTE, a 5th generation (5 Generation, 5G) communications system, or a new radio (new radio, NR) system. In addition, the communications system is further applicable to a future-oriented communications technology to which the technical solutions provided in embodiments of this application are applicable. The system architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Figure 3:
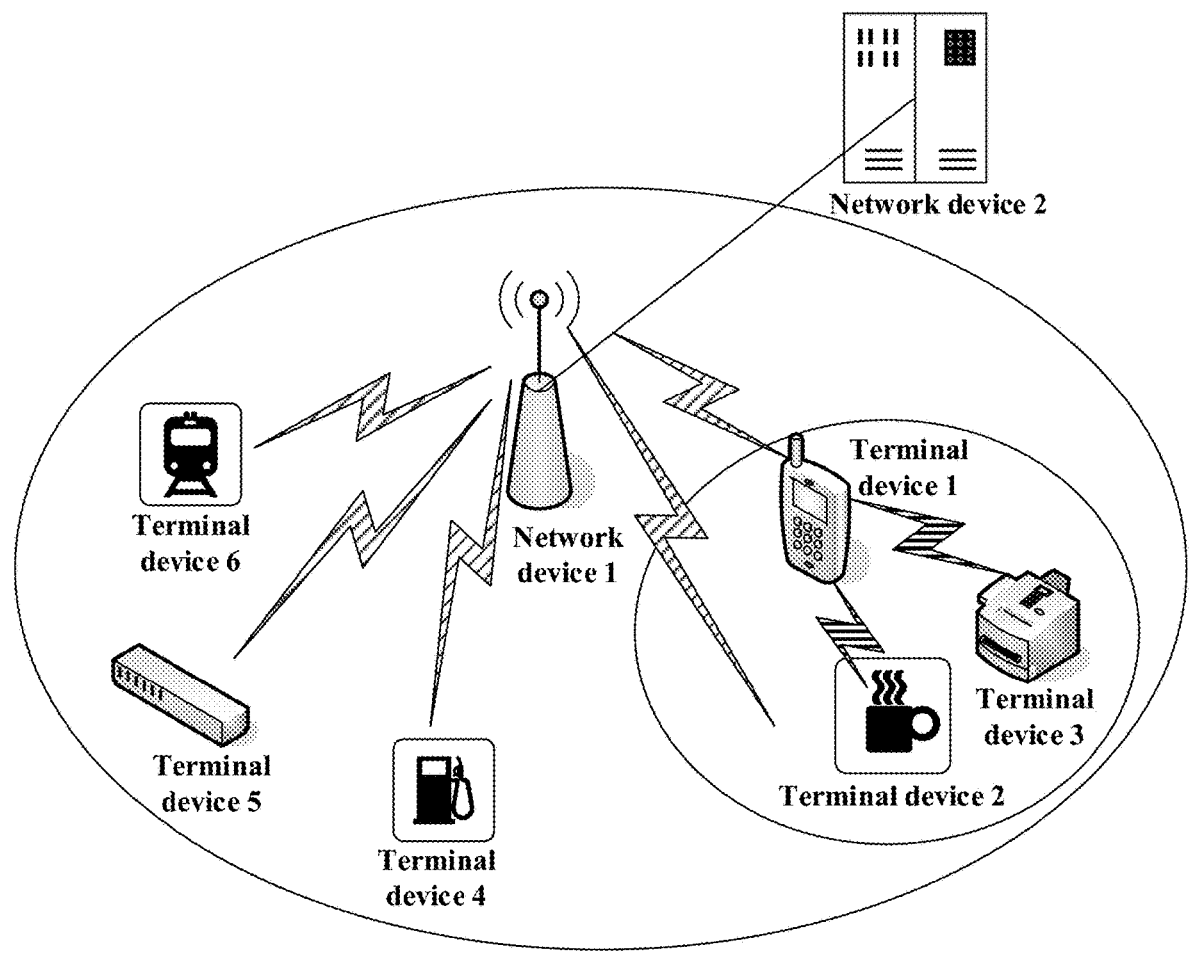
FIG. 3 is an example diagram of a communications system according to an embodiment of this application.

FIG. 3 is an example diagram of a communications system according to an embodiment of this application. As shown in FIG. 3, a network device 1 and six terminal devices (including a terminal device 1, a terminal device 2, a terminal device 3, a terminal device 4, a terminal device 5, and a terminal device 6) constitute one communications system. In the communications system, after the terminal device establishes a connection to the network device 1, the terminal device may send uplink data to the network device 1, and the network device 1 may receive the uplink data sent by the terminal device. In addition, after the terminal device establishes the connection to the network device 1, the network device 1 may send downlink data to the terminal device, and the terminal device may receive the downlink data sent by the base station. The network device 1 is communicatively connected to the network device 2, to communicate with another communications system.

In this embodiment of this application, the terminal device is also referred to as user equipment (user equipment, UE), a mobile station (mobile station, MS), a mobile terminal (mobile terminal, MT), or the like, and is a device that provides voice and/or data connectivity to a user, or a chip disposed in the device, for example, a handheld device or a vehicle-mounted device with a wireless connection function. Currently, some examples of the terminal device are a mobile phone (mobile phone), a tablet computer, a notebook computer, a palmtop computer, a mobile Internet device (mobile internet device, MID), a wearable terminal, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), and a wireless terminal in a smart home (smart home).

The network device (including the network device 1 and the network device 2) may be any device with a wireless reception/transmission function or a chip disposed in a device with a wireless reception/transmission function. The network device includes but is not limited to a base station (for example, a base station BS, a NodeB NodeB, an evolved NodeB eNodeB or eNB, a gNodeB gNodeB or gNB in a 5th generation 5G communications system, a base station in a future communications system, or an access node, a wireless relay node, or a wireless backhaul node in a WiFi system). The base station may be a macro base station, a micro base station, a picocell base station, a small cell, a relay station, or the like. A plurality of base stations may support networks with one or more of the foregoing technologies or a future evolved network. The base station may include one or more intra-station or inter-station transmission reception points (transmission reception point, TRP). The network device may be alternatively a wireless controller, a central unit (central unit, CU), a distributed unit (distributed unit, DU), or the like in a cloud radio access network (cloud radio access network, CRAN) scenario. The following uses, for description, an example in which the network device is a base station. A plurality of network devices may be base stations of a same type, or may be base stations of different types. The base station may communicate with the terminal device, or may communicate with the terminal device by using a relay station. The terminal device may support communication with a plurality of base stations with different technologies. For example, the terminal device may support communication with a base station that supports an LTE network, or may support communication with a base station that supports a 5G network, or may support dual connections to a NodeB in an LTE network and a gNodeB in a 5G network. For example, the terminal device is connected to a RAN node in a radio network. Currently, some examples of the RAN node are a gNB, a TRP, an evolved NodeB (evolved NodeB, eNB), a next generation evolved NodeB (next generation evolved NodeB, LTE ng-eNB), a radio network controller (radio network controller, RNC), a NodeB (NodeB, NB), a base station controller (base station controller, BSC), a base transceiver station (base transceiver station, BTS), a home base station (for example, a home evolved NodeB or home NodeB, HNB), a baseband unit (baseband unit, BBU), and a WiFi access point (access point, AP). In the example of FIG. 3, the network device 1 may be a network device of a base station type, and the network device 2 may be a network device of a core network device.

Embodiment 1

A terminal device may select a proper random access resource based on an actual case, to perform random access. A procedure of selecting the random access resource is similar to that in the foregoing embodiment corresponding to FIG. 1. The reference information in step 101 includes an emergency set, and the emergency set includes one or more of initial access from a radio resource control RRC idle mode, RRC connection re-establishment, uplink or downlink data arrival during an RRC connected mode when a downlink synchronization status is "non-synchronized", downlink data arrival during the RRC connected mode when there are no physical uplink control channels PUCCHs for a scheduling request available, a scheduling request failure, a transition from an RRC inactive mode, handover, downlink data arrival when an uplink synchronization status is "non-synchronized", synchronous reconfiguration, establishment of time alignment when a secondary cell is added, a request for specific system information, and beam recovery.

The emergency includes a contention-based random access scenario and a non-contention based random access scenario. The following describes the contention-based random access scenario in detail.

1. Initial access from the RRC idle mode (Initial access from RRC_IDLE)

In this case, a status of an RRC layer is RRC_IDLE, the terminal device needs to have a connection setup request (CONNECTION SETUP REQUEST), and a network device 1 cannot know the need. Therefore, the terminal device needs to be triggered to perform a contention-based random access procedure.

2. RRC connection re-establishment (RRC connection re-establishment procedure)

There are a plurality of reasons for RRC connection re-establishment. For example, when a quantity of radio link control (radio link control, RLC) uplink retransmissions on a terminal device side reaches the maximum, re-establishment is triggered. In this case, the network device 1 does not know a re-establishment status of the terminal device, and the terminal device also needs to be triggered to perform a contention-based random access procedure.

3. Uplink or downlink data arrival during the RRC connected mode when the downlink synchronization status is "non-synchronized" (UL data arrival during RRC_CONNECTED when UL synchronisation status is "non-synchronised")

That an uplink is non-synchronized means that when the terminal device sends data (for example, needs to report a measurement report or send user data), the uplink is in the "non-synchronized" state. This case is similar to initial access, and the network device 1 cannot know when the terminal device has an uplink service to be performed. Therefore, the terminal device needs to be triggered to perform a contention-based random access procedure.

4. Downlink data arrival during the RRC connected mode when there are no physical uplink control channels PUCCHs for a scheduling request available (UL data arrival during RRC_CONNECTED when there are no PUCCH resources for SR available)

If the terminal device does not have uplink scheduling grant information (UL_GRANT) for sending a buffer status report (Buffer Status Report, BSR), the terminal device sends an uplink resource application by using an uplink scheduling request (Scheduling Request, SR). However, if there is no SR resource, the terminal device can apply for UL_GRANT only by performing a contention access procedure. In this case, it is clear that the network device 1 does not know whether the terminal device needs to send uplink data. In these two cases, only contention-based random access can be performed.

5. Scheduling request failure (scheduling request failure)

After an SR fails to be sent, the terminal device also needs to perform contention-based random access.

6. Transition from the RRC inactive mode (Transition from RRC_INACTIVE)

When actively triggering status migration, the terminal device uses a contention-based random access procedure. When the network device 1 triggers status migration from INACTIVE to CONNECTED by using RAN paging, because the paging does not carry a random access channel (random access channel, RACH) resource, a contention-based RA procedure is also used.

The following describes the non-contention based random access scenario in detail (it may be understood that, if the network device 1 finds that there is no non-contention resource in a non-contention based access procedure, switching to a contention access procedure is performed).

7. Handover (handover)

Handover is initiated on a network device side. Therefore, a non-contention based access procedure is preferentially performed.

8. Downlink data arrival when the uplink synchronization status is "non-synchronized" (DL data arrival during RRC_CONNECTED when UL synchronisation status is "non-synchronised")

When downlink data arrives (in this case, an ACK/a NACK needs to be returned), and the uplink is in the "non-synchronized" state, MAC and RRC need to perform processing in cooperation on a network device side, to preferentially perform a non-contention based access procedure. When no dedicated preamble is available, a contention-based random access procedure is triggered.

9. Synchronous reconfiguration (Request by RRC upon synchronous reconfiguration)

RRC signaling reconfigurationWithSync includes a dedicated RACH resource to use non-contention based random access.

10. Establishment of time alignment for a secondary timing advance group (Secondary Timing Advance Group)

In a 5G NR system, a RACH procedure is triggered when an SCell is added.

11. Request for other system information (Request for Other SI)

The terminal device initiates RA when the terminal device needs to request specific SI. When a field si-SchedulingInfo in a SIB 1 message includes si-RequestConfig or si-RequestConfigSUL, the terminal device uses, based on a non-contention scenario, a Msg 1 to notify the network side to obtain system information. On the contrary, the terminal device uses, based on a contention scenario, a Msg 3 to send an SI request message.

12. Beam failure recovery (beam failure recovery)

After detecting a beam failure, the terminal device first triggers a beam failure recovery procedure by initiating a random access procedure on a PCell, and then selects a proper beam to perform the beam failure recovery procedure. If the network device 1 provides a dedicated random access resource, non-contention based random access is preferentially performed. After the random access procedure is completed, it is also considered that the beam failure recovery procedure is completed.

In addition, in an LTE system, when the terminal device performs a positioning procedure, the terminal device may perform non-contention based random access.

It may be understood that, in the foregoing scenarios, when the terminal device needs to perform contention/non-contention based random access, a random access resource may be selected by using the method in embodiments of this application. In other words, when the foregoing events trigger random access, the terminal device may select a random access resource based on the method in embodiments of this application, and then perform random access based on the selected random access resource.

When the terminal device detects that a related parameter complies with the foregoing emergency set, the terminal device may consider that the reference information and the first parameter meet a preset condition. The first parameter may be a type of an event that currently triggers random access, and the reference information may include the emergency set. When the type of the event that currently triggers random access is in accord with any emergency in the emergency set, the preset condition is met.

The foregoing emergencies are only some examples in this embodiment of this application. In actual application, the terminal device and the network device 1 may further agree on another event used as an emergency. This is not limited in this embodiment of this application.

The emergency set may be included in the reference information. The terminal device may obtain the emergency set by obtaining the reference information.

In some embodiments, the terminal device and the network device may pre-agree on the emergency set (through a protocol, information exchange, or the like). When the terminal device detects that a current event belongs to the pre-agreed emergency set, the terminal device determines that a first preset condition is met, and selects a random access resource based on a first probability and a second probability.

In some embodiments, the terminal device may obtain the reference information in advance. The reference information includes the pre-agreed emergency set. When the terminal device detects that the current event belongs to the pre-agreed emergency set, the terminal device determines that the first preset condition is met, and selects the random access resource based on the first probability and the second probability.

The terminal device may determine, through detection in the following manner, whether the current event belongs to the pre-agreed emergency set: The terminal device obtains a current event log, and determines whether each of events in the log is one event in the emergency set. In actual application, there may be another detection manner. This is not limited in this embodiment of this application.

In this embodiment of this application, the reference information obtained by the terminal device may include the emergency set, the first parameter includes the type of the event that currently triggers random access, and the preset condition includes that the type of the event that triggers random access belongs to the emergency set. Alternatively, the reference information obtained by the terminal device may include a preset parameter range, the first parameter includes a delay requirement of an arrived service, and the preset condition includes that the delay requirement of the arrived service falls within the preset parameter range. Alternatively, the reference information obtained by the terminal device may include a preset parameter range, the first parameter includes a priority requirement of an arrived service, and the preset condition includes that the priority requirement of the arrived service falls within the preset parameter range. Refer to Embodiment 2.

Embodiment 2

Figure 4:
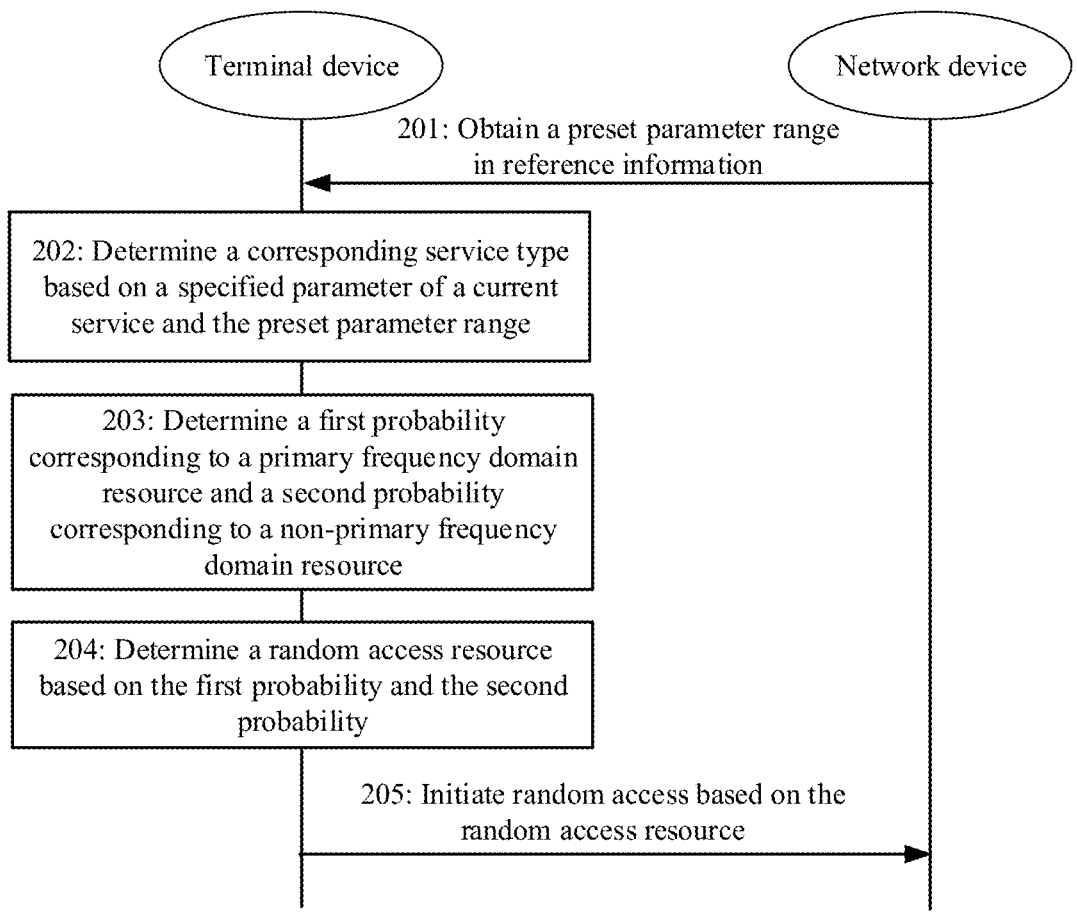
FIG. 4 is a signaling diagram of a random access resource selection method according to Embodiment 2 of this application.

FIG. 4 is a signaling diagram of a random access resource selection method according to Embodiment 2 of this application. The method includes the following steps.

201: A terminal device obtains a preset parameter range in reference information.

In this embodiment of this application, after receiving an instruction, the terminal device may obtain the reference information, and selects a random access resource; or after receiving the reference information, the terminal device triggers random access resource selection. This is not limited in this embodiment of this application.

The reference information may be delivered by a network device (for example, a base station or a core network device), or may be agreed on in a protocol. For example, in the example corresponding to FIG. 3, the network device 1 may deliver the reference information to the terminal device.

In this embodiment of this application, the reference information may include the preset parameter range. The preset parameter range may be determined based on a parameter maximum or a parameter minimum, or may be determined based on a threshold of a service type. The threshold means that if a specified parameter of a current service is greater than the threshold, the current service belongs to a service type A; or if a specified parameter of a current service is less than or equal to the threshold, the current service belongs to a service type B. The threshold may be at least one of a priority (Priority Level) threshold and a delay (Packet Delay Budget) threshold. In actual application, the preset parameter range may be alternatively of a different type based on an actual case, for example, is specified as another parameter threshold such as a data packet loss rate threshold. This is not limited in this embodiment of this application.

In addition, the preset parameter range may directly correspond to a parameter range, for example, delays 100 ms to 300 ms. If a specified parameter of a current service falls within the parameter range, the current service belongs to a service type A; or if a specified parameter of a current service falls beyond the parameter range, the current service belongs to a service type B.

In some embodiments, the reference information may further include an emergency set, and the terminal device may obtain the emergency set from the reference information. The terminal device may determine, through detection, whether a current event belongs to the pre-agreed emergency set. If yes, the terminal device may determine that a first preset condition is met, and select a random access resource based on a first probability and a second probability.

When the reference information includes both the emergency set and the preset parameter range, the terminal device may first determine whether the current event belongs to the emergency set. If yes, the terminal device determines a corresponding service type based on a specified parameter, and selects a primary frequency domain resource or a non-primary frequency domain resource based on a probability value corresponding to the service type, to initiate random access.

In other embodiments, the reference information may further include a measurement result of each frequency domain resource. The measurement result of each frequency domain resource is used to calculate the first probability and the second probability. In other cases, alternatively, the measurement result may not be included in the reference information, but may be obtained in another manner. This is not limited in this embodiment of this application.

202: The terminal device determines a corresponding service type based on a specified parameter of a current service and the preset parameter range.

In this embodiment of this application, the terminal device may determine the corresponding service type based on the specified parameter (which may also be referred to as a first parameter, for example, may include a delay requirement of an arrived service or a priority requirement of an arrived service) of the current service and the preset parameter range that is obtained in step 201.

The delay threshold and the priority threshold are used as examples. For example, when the delay requirement of the arrived service is less than or equal to the delay threshold, the terminal device determines that the service is a first-type service, and when the delay requirement of the arrived service is greater than the delay threshold, the terminal device determines that the service is a second-type service. Alternatively, when a priority of the arrived service is greater than or equal to the priority threshold, the terminal device determines that the service is a first-type service, and when the priority of the arrived service is less than the priority threshold, the terminal device determines that the service is a second-type service.

For example, in an LTE communications system, the terminal device may determine, based on an EPS QoS class identifier (QCI), whether a corresponding service is a first-type service or a second-type service. Table 1 shows examples of the QCI in this embodiment of this application. In Table 1, for example, if a current arrived service is conversational voice (conversational voice), a corresponding delay requirement is 100 ms. If the delay threshold in the preset parameter range obtained by the terminal device is 150 ms, the terminal device determines that the service (conversational voice) is a first-type service.

TABLE 1

| QCI | Priority level | Delay requirement | Service example |
|---|---|---|---|
| 1 | 2 | 100 ms | Conversational voice |
| 2 | 4 | 150 ms | Video chat (livestreaming service) |
| . . . | . . . | . . . | . . . |

For example, in a 5G NR communications system, the terminal device may determine, based on a 5G QoS class identifier (5QI), whether a corresponding service is a first-type service or a second-type service. Table 2 shows examples of the 5QI in this embodiment of this application. In Table 2, for example, if a current arrived service is conversational voice (conversational voice), a corresponding delay is 100 ms. If the delay threshold in the preset parameter range obtained by the terminal device is 150 ms, the specified parameter (the delay 100 ms) of the current service is less than the threshold (the delay threshold 150 ms), and the terminal device determines that the service (conversational voice) is a first-type service.

TABLE 2

| 5QI value | Inter-QoS flow resource scheduling priority | Delay | Service example |
|---|---|---|---|
| 1 | 20 | 100 ms | Conversational voice |
| 2 | 40 | 150 ms | Video chat (livestreaming service) |
| ... | ... | ... | ... |

It should be noted that, in Table 2, the inter-QoS flow resource scheduling priority (Default Priority Level) is used to distinguish between priorities of QoS flows in a terminal device or between different terminal devices. A smaller value indicates a higher priority, and a value ranges from 1 to 127. In Table 2, the delay (Packet Delay Budget) represents a delay from the terminal device to a core network (UPF).

In some embodiments, the terminal device may jointly determine a corresponding service type based on a plurality of specified parameters and the preset parameter range. For example, when the delay requirement of the arrived service is less than or equal to the delay threshold and the priority of the arrived service is greater than or equal to the priority threshold, the terminal device determines that the service is a first-type service. When the delay requirement of the arrived service is less than or equal to the delay threshold and the priority of the arrived service is less than the priority threshold, the terminal device determines that the service is a second-type service. When the delay requirement of the arrived service is greater than the delay threshold and the priority of the arrived service is greater than or equal to the priority threshold, the terminal device determines that the service is a third-type service. When the delay requirement of the arrived service is greater than the delay threshold and the priority of the arrived service is less than the priority threshold, the terminal device determines that the service is a fourth-type service. Table 3 shows an example of a correspondence between a determining condition and a service type.

TABLE 3

| | Is the delay requirement of the service less than or equal to the delay threshold | Is the priority of the service greater than or equal to the priority threshold | Service type |
|---|---|---|---|
| Case 1 | Yes | Yes | First-type service |
| Case 2 | Yes | No | Second-type service |
| Case 3 | No | Yes | Third-type service |
| Case 4 | No | No | Fourth-type service |

In actual application, there may be another case and a corresponding service type. This is not limited in this embodiment of this application.

203: The terminal device determines, based on the service type, the first probability corresponding to the primary frequency domain resource and the second probability corresponding to the non-primary frequency domain resource.

In this embodiment of this application, the terminal device may determine, based on the service type obtained in step 302, the first probability corresponding to the primary frequency domain resource and the second probability corresponding to the non-primary frequency domain resource. It may be understood that there is a correspondence between the service type obtained in step 302 and both the first probability and the second probability. The correspondence may be in a form of a table, or may be in a form of a formula. In actual application, the correspondence may be alternatively in another form. This is not limited in this embodiment of this application.

For example, in some cases, an example represented in the form of a table is shown in Table 4, and Table 4 shows a table example of a correspondence between the service type and both the first probability and the second probability. In Table 4, all of P1 to P8 are preset probabilities, and may be read based on an actual requirement.

TABLE 4

| Service type | First probability | Second probability |
|---|---|---|
| First-type service | P1 | P2 |
| Second-type service | P3 | P4 |
| Third-type service | P5 | P6 |
| Fourth-type service | P7 | P8 |
| ... | ... | ... |

For example, in other cases, an example represented in the form of a table is shown in Table 5, and Table 5 shows another table example of the correspondence between the service type and both the first probability and the second probability. In Table 5, P is a preset probability, $q(i)$ is relative quality of the $i^{th}$ primary frequency domain resource or non-primary frequency domain resource, q is a sum of all relative quality, i is an integer greater than or equal to 1, and P5 and P6 are preset probabilities. After determining the service type, the terminal device may calculate the first probability and the second probability based on a corresponding formula. In some cases, if the terminal device determines that the service type is the fourth-type service, the terminal device may select a random access resource in a conventional manner, to initiate random access, and therefore the fourth-type service does not have a corresponding first probability and second probability.

TABLE 5

| Service type | First probability | Second probability |
|---|---|---|
| First-type service | P | $(1 - P)*q(i)/q$ |
| Second-type service | $q(i)/q$ | $q(i)/q$ |
| Third-type service | P5 | P6 |
| Fourth-type service | XX | XX |
| ... | ... | ... |

204: The terminal device determines a random access resource based on the first probability and the second probability.

In this embodiment of this application, step 204 is similar to step 103 in the foregoing embodiments corresponding to FIG. 1. Details are not described again in this embodiment of this application.

205: The terminal device performs random access based on the random access resource.

In this embodiment of this application, step 205 is similar to step 104 in the foregoing embodiments corresponding to FIG. 1. Details are not described again in this embodiment of this application.

In Embodiment 2 of this application, the terminal device first determines a service type to which a current service belongs, and then determines the first probability and the second probability based on a delay requirement and a priority requirement of the service, so that the random access resource selection method in this application can adapt to various services, and different probability allocations can be performed based on different requirements of a plurality of services. Therefore, the random access resource selection method can meet a timeliness requirement of a terminal device with a plurality of services.

Embodiment 3

Figure 5:
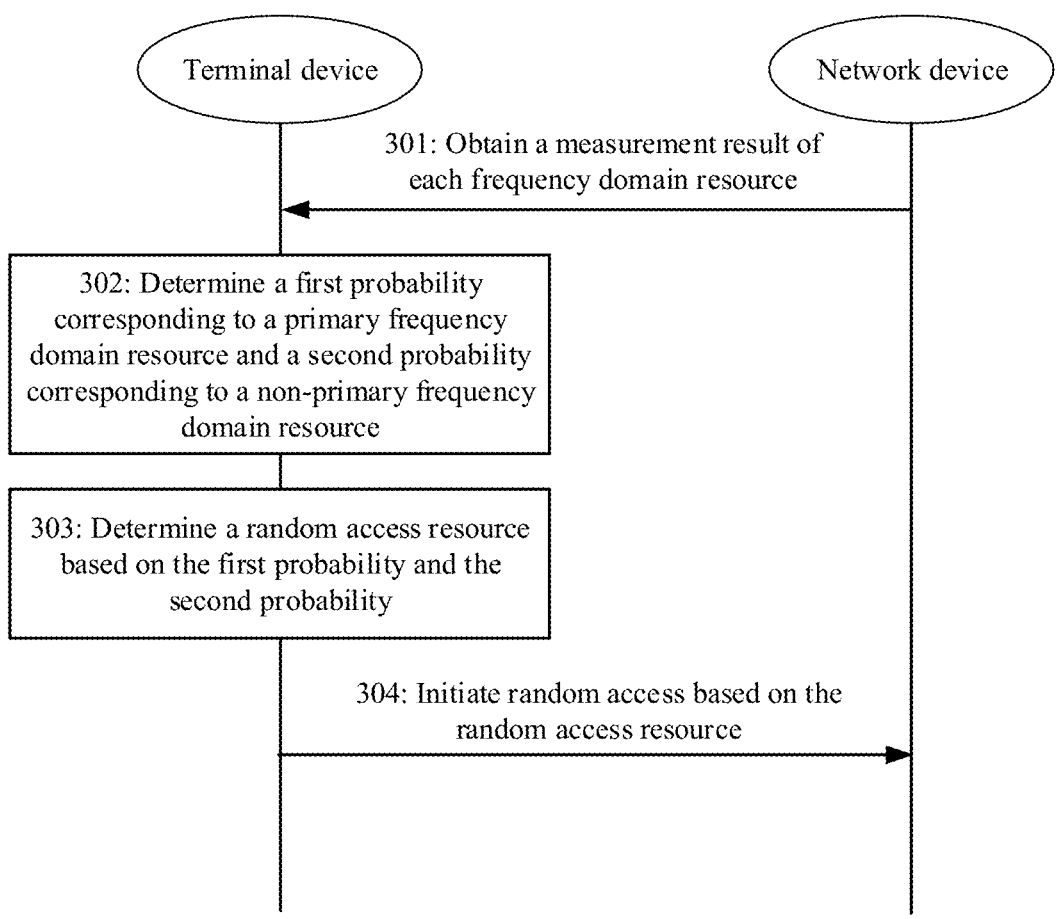
FIG. 5 is a signaling diagram of a random access resource selection method according to Embodiment 3 of this application.

FIG. 5 is a signaling diagram of a random access resource selection method according to Embodiment 3 of this application. The method includes the following steps.

301: A terminal device obtains a measurement result of each frequency domain resource.

In some embodiments, the terminal device may obtain reference information, and the reference information may include the measurement result of each frequency domain resource. After obtaining the reference information, the terminal device may extract the measurement result of each frequency domain resource from the reference information.

In this embodiment of this application, the terminal device may measure each frequency domain resource to obtain a corresponding measurement result. For example, the terminal device may measure a downlink reference signal to obtain a measurement result of the downlink reference signal.

For example, the terminal device may obtain a measurement result by measuring a reference signal sent by an access network device, and the reference signal may include at least one of the following: a cell-specific reference signal (cell-specific reference signal, CRS), a synchronization signal block (synchronization signal block, SSB), and a channel state information reference signal (channel state information reference signal, CSI-RS). The measurement result may include at least one of the following: reference signal received power (reference signal received power, RSRP), reference signal received quality (reference signal received quality, RSRQ), a signal to interference plus noise ratio (signal interference noise ratio, SINR), a signal-to-noise ratio (signal noise ratio, SNR), and the like.

In actual application, the terminal device may further measure another reference signal to obtain another type of measurement result. This is not limited in this embodiment of this application.

The measurement result may be a measurement result obtained at a time, or may be periodic measurement results. For example, the terminal device may set a preset time interval, in other words, perform one-period measurement at an interval of a period of time to obtain periodic measurement results.

302: The terminal device determines a first probability corresponding to a primary frequency domain resource and a second probability corresponding to a non-primary frequency domain resource.

In this embodiment of this application, the terminal device may determine, based on the measurement result obtained in step 201, the first probability corresponding to the primary frequency domain resource and the second probability corresponding to the non-primary frequency domain resource. It may be understood that there is a correspondence between the measurement result obtained in step 201 and both the first probability and the second probability. The correspondence may be in a form of a list, or may be in a form of a formula. In actual application, the correspondence may be alternatively in another form. This is not limited in this embodiment of this application.

In one case, if the terminal device scales only a probability that another frequency resource is selected, the correspondence may be represented as follows by using a formula:

1. A probability (first probability) that the primary frequency domain resource is selected is P; and
2. a probability (second probability) that another frequency domain resource is selected is $(1-P)*q(i)/q$.

P is a preset probability, $q(i)$ is relative quality of the $i^{th}$ non-primary frequency domain resource, q is a sum of relative quality of all non-primary frequency domain resources, and i is an integer greater than or equal to 1.

Figure 6:
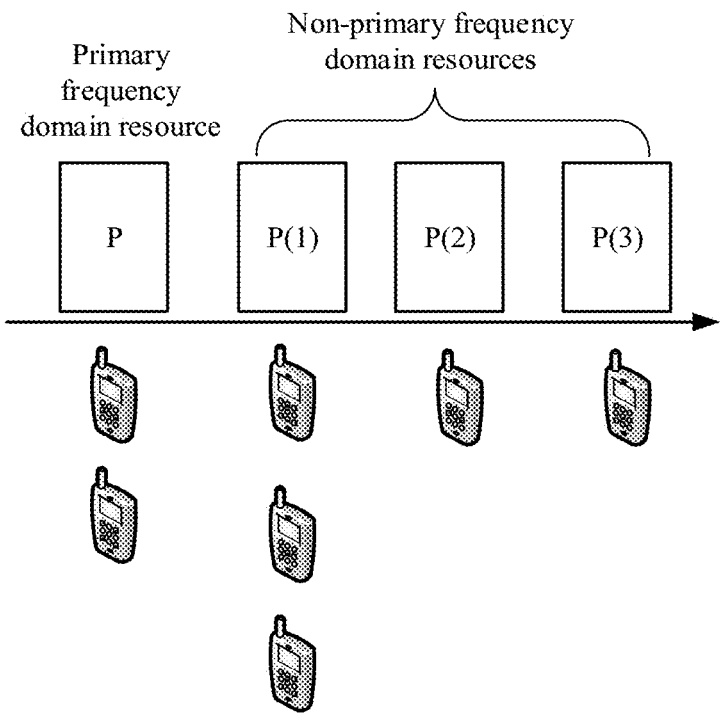
FIG. 6 is an example diagram of a primary frequency domain resource and a non-primary frequency domain resource according to an embodiment of this application.

For example, FIG. 6 is an example diagram of a primary frequency domain resource and a non-primary frequency domain resource according to an embodiment of this application. P preset for the primary frequency domain resource is 50%, and relative quality of other frequency domain resources may be represented by relative values of RSRP in a measurement result. The other frequency domain resources include a frequency domain resource 1, a frequency domain resource 2, and a frequency domain resource 3. Relative quality of the frequency domain resource 1 is $q(1)=1$, relative quality of the frequency domain resource 2 is $q(2)=2$, and relative quality of the frequency domain resource 3 is $q(3)=3$. A sum of relative quality of all the non-primary frequency domain resources is $q=q(1)+q(2)+q(3)=6$. In this case, a second probability corresponding to the frequency domain resource 1 is $P(1)=(1-P)*q(1)/q=(1-50\%)*1/6=1/12=8.33\%$, a second probability corresponding to the frequency domain resource 2 is $P(2)=(1-P)*q(2)/q=(1-50\%)*2/6=2/12=16.66\%$, and a second probability corresponding to the frequency domain resource 3 is $P(3)(1-P)*q(3)/q=(1-50\%)*3/6=3/12=25\%$. The relative quality may be calculated based on an actual value of RSRP or a related parameter. This is not limited in this embodiment of this application.

In another case, if the terminal device scales, by using measurement results corresponding to the frequency domain resources, probabilities that all the frequency resources are selected, the correspondence may be represented as follows by using a formula:

1. A probability (first probability) that the primary frequency domain resource is selected is $q(i)/q$; and
2. a probability (second probability) that another frequency domain resource is selected is $q(i)/q$.

$q(i)$ is relative quality of the $i^{th}$ primary frequency domain resource relative to the non-primary frequency domain resource, q is a sum of all relative quality, and i is an integer greater than or equal to 1.

In the method for determining the first probability and the second probability described in this step, a frequency resource with a relatively good measurement result indicates that quality of the frequency resource is relatively good, and a corresponding probability that the frequency resource is selected is relatively large; and correspondingly, a frequency resource with a relatively poor measurement result indicates that quality of the frequency resource is relatively poor, and a corresponding probability that the frequency resource is selected is relatively small. In actual application, to achieve this objective, the terminal device may further set another formula suitable to a specific application scenario. This is not limited in this embodiment of this application.

303: The terminal device determines a random access resource based on the first probability and the second probability.

In this embodiment of this application, step 303 is similar to step 103 in the foregoing embodiments corresponding to FIG. 1. Details are not described again in this embodiment of this application.

304: The terminal device performs random access based on the random access resource.

In this embodiment of this application, step 304 is similar to step 104 in the foregoing embodiments corresponding to FIG. 1. Details are not described again in this embodiment of this application.

In Embodiment 3 of this application, after receiving the measurement result, the terminal device triggers random access resource selection, or after receiving an instruction, the terminal device performs measurement to obtain the measurement result, or the terminal device periodically performs measurement. This is not limited in this embodiment of this application.

Figure 7:
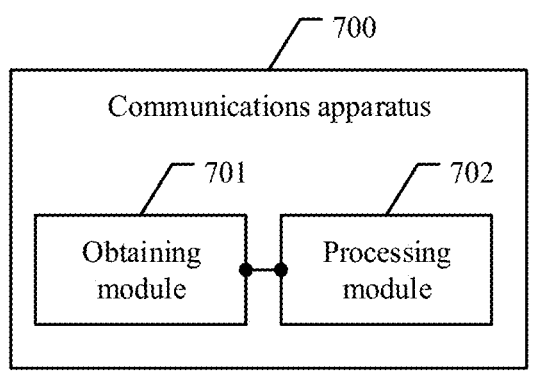
FIG. 7 is a schematic diagram of a communications apparatus according to an embodiment of this application.

FIG. 7 is a schematic diagram of a communications apparatus according to an embodiment of this application. The communications apparatus 700 includes:
an obtaining module 701 and a processing module 702.
The communications apparatus 700 may be the terminal device in the foregoing method embodiments shown in FIG. 1, FIG. 4, and FIG. 5.

The obtaining module 701 may be configured to perform step 101 in the foregoing embodiments corresponding to FIG. 1 or another related step, or perform step 201 in the foregoing method embodiment shown in FIG. 4 or another related step, or perform step 301 in the foregoing method embodiment shown in FIG. 5 or another related step.

The processing module 702 may be configured to perform step 102, step 103, and step 104 in the foregoing embodiments corresponding to FIG. 1 or another related step, or perform step 202, step 203, and step 204 in the foregoing method embodiment shown in FIG. 4 or another related step, or perform step 302, step 303, step 304, and step 305 in the foregoing method embodiment shown in FIG. 5 or another related step.

It should be understood that the communications apparatus 700 corresponds to the terminal device in the foregoing method embodiments, the units in the communications apparatus 700 and the foregoing other operations and/or functions are separately used to implement various steps and methods implemented by the terminal device in the method shown in FIG. 1, the terminal device in the method shown in FIG. 5, or the terminal device in the method shown in FIG. 4. For details, refer to the foregoing method embodiments. For brevity, details are not described herein again.

Figure 8:
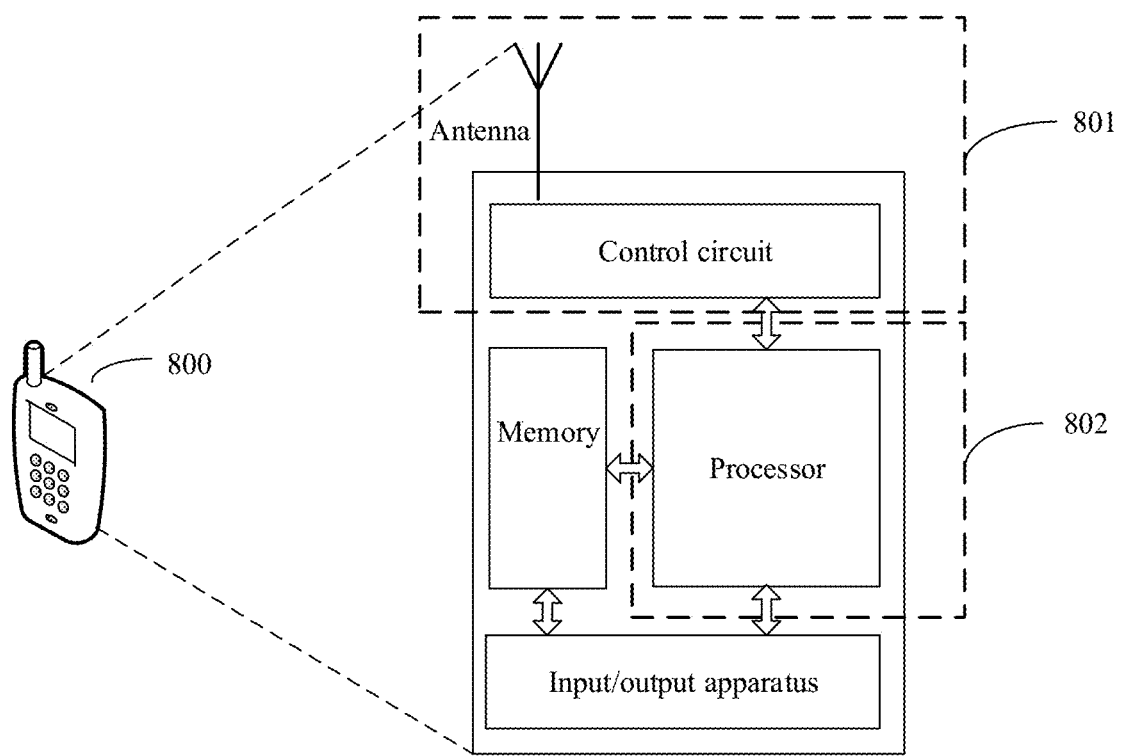
FIG. 8 is a schematic diagram of a structure of a terminal device according to an embodiment of this application.

FIG. 8 is a schematic diagram of a structure of a terminal device 800 according to an embodiment of this application. The terminal device 800 may be applied to the system shown in FIG. 3, and perform functions of the terminal device in the foregoing method embodiments. For ease of description, FIG. 8 shows only main components of the terminal device. As shown in FIG. 8, the terminal device 800 includes a processor, a memory, a control circuit, an antenna, and an input/output apparatus. The processor is mainly configured to process a communications protocol and communications data, control the entire terminal device, execute a software program, and process data of the software program. For example, the processor is configured to support the terminal device in performing actions described in the foregoing method embodiments, for example, receiving a use threshold for a wake-up signal, and determining, based on the use threshold and an eDRX period, whether to monitor the wake-up signal. The memory is mainly configured to store a software program and data, for example, store the use threshold for the wake-up signal described in the foregoing embodiments. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that for ease of description, FIG. 8 shows only one memory and only one processor. In an actual terminal device, there may be a plurality of processors and a plurality of memories. The memory may also be referred to as a storage medium, a storage device, or the like. This is not limited in embodiments of this application.

In an optional implementation, the processor may include a baseband processor and/or a central processing unit. The baseband processor is mainly configured to process the communication protocol and the communication data. The central processing unit is mainly configured to control the entire terminal device, execute the software program, and process the data of the software program. Functions of a baseband processor and a central processing unit may be integrated into the processor in FIG. 8. A person skilled in the art may understand that the baseband processor and the central processing unit may be alternatively independent processors, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

In this embodiment of this application, the antenna with a reception/transmission function and the control circuit may be considered as a transceiver 801 of the terminal device 800, configured to, for example, support the terminal device in performing the foregoing receiving function and sending function. The processor with a processing function is considered as a processor 802 of the terminal device 800. As shown in FIG. 8, the terminal device 800 includes the transceiver 801 and the processor 802. The transceiver may also be referred to as a transceiver apparatus or the like. Optionally, a component that is in the transceiver 801 and that is configured to implement a receiving function may be considered as a receiving unit, and a component that is in the transceiver 801 and that is configured to implement a sending function may be considered as a sending unit. In other words, the transceiver 801 includes the receiving unit and the sending unit. The receiving unit may also be referred to as a receiver, an input port, a receiver circuit, or the like, and the sending unit may be referred to as a transmitter, a transmitter circuit, or the like.

The processor 802 may be configured to execute instructions stored in the memory, to control the transceiver 801 to receive a signal and/or send a signal, to complete functions of the terminal device in the foregoing method embodiments. In an implementation, a function of the transceiver 801 may be implemented by using a transceiver circuit or a dedicated transceiver chip.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A random access resource selection method, comprising:
obtaining reference information, wherein the reference information comprises an emergency set or a preset parameter range; and
in response to determining that a first parameter and the reference information satisfy a preset condition, selecting a primary frequency domain resource or a non-primary frequency domain resource based on a first probability corresponding to the primary frequency domain resource and a second probability corresponding to the non-primary frequency domain resource, wherein the first parameter comprises a type of an event that triggers random access, the preset condition comprises the type of the event that triggers random access belongs to the emergency set, and the first probability is determined to be higher than the second probability when the type of the event that triggers random access belongs to the emergency set.

2. The method according to claim 1, wherein the primary frequency domain resource and the non-primary frequency domain resource are: (1) an initial bandwidth part and a non-initial bandwidth part; (2) an anchor carrier and a non-anchor carrier; or (3) a first narrowband and a non-first narrowband.

3. The method according to claim 1, wherein the first parameter comprises a delay requirement of an arrived service, and the preset condition comprises:
the delay requirement of the arrived service falls within the preset parameter range.

4. The method according to claim 1, wherein the first parameter comprises a priority requirement of an arrived service, and the preset condition comprises:
the priority requirement of the arrived service falls within the preset parameter range.

5. The method according to claim 1, wherein the emergency set comprises at least one of the following events: initial access from a radio resource control (RRC) idle mode, RRC connection re-establishment, uplink or downlink data arrival during an RRC connected mode when a downlink synchronization status is "non-synchronized", downlink data arrival during the RRC connected mode when there are no physical uplink control channels (PUCCHs) for a scheduling request available, a scheduling request failure, a transition from an RRC inactive mode, downlink data arrival when an uplink synchronization status is "non-synchronized", synchronous reconfiguration, establishment of time alignment for a secondary timing advance group, a request for other system information, and beam failure recovery.

6. The method according to claim 1, wherein before the selecting a primary frequency domain resource or a non-primary frequency domain resource based on a first probability and a second probability, to initiate random access, the method further comprises:

obtaining a measurement result of each frequency resource; and determining the first probability and the second probability based on the measurement result.

7. The method according to claim 1, wherein the method further comprises:

receiving, from an access network device, capability indication information indicating a terminal device to select the primary frequency domain resource or the non-primary frequency domain resource in response to determining that the first parameter and the reference information satisfy the preset condition.

8. A communications apparatus, comprising:

at least one processor;

a memory storing programming instructions for execution by the at least one processor to:

obtain reference information, wherein the reference information comprises an emergency set or a preset parameter range; and in response to determining that a first parameter and the reference information satisfy a preset condition, select a primary frequency domain resource or a non-primary frequency domain resource based on a first probability corresponding to the primary frequency domain resource and a second probability corresponding to the non-primary frequency domain resource, wherein the first parameter comprises a type of an event that triggers random access, the preset condition comprises the type of the event that triggers random access belongs to the emergency set, and the first probability is determined to be higher than the second probability when the type of the event that triggers random access belongs to the emergency set.

9. The apparatus according to claim 8, wherein the primary frequency domain resource and the non-primary frequency domain resource are: (1) an initial bandwidth part and a non-initial bandwidth part; (2) an anchor carrier and a non-anchor carrier; (3) a first narrowband and a non-first narrowband.

10. The apparatus according to claim 8, wherein the first parameter comprises a delay requirement of an arrived service, and the preset condition comprises:

the delay requirement of the arrived service falls within the preset parameter range.

11. The apparatus according to claim 8, wherein the first parameter comprises a priority requirement of an arrived service, and the preset condition comprises:

the priority requirement of the arrived service falls within the preset parameter range.

12. The apparatus according to claim 8, wherein the emergency set comprises at least one of the following: initial access from a radio resource control (RRC) idle mode, RRC connection re-establishment, uplink or downlink data arrival during an RRC connected mode when a downlink synchronization status is "non-synchronized", downlink data arrival during the RRC connected mode when there are no physical uplink control channels (PUCCHs) for a scheduling request available, a scheduling request failure, a transition from an RRC inactive mode, downlink data arrival when an uplink synchronization status is "non-synchronized", synchronous reconfiguration, establishment of time alignment for a timing advance group, a request for other system information, and beam failure recovery.

13. The apparatus according to claim 8, wherein the processor is further configured to:

obtain a measurement result of each frequency resource; and determine the first probability and the second probability based on the measurement result.

14. The apparatus according to claim 8, wherein the apparatus is further comprises:

receive, from an access network device, capability indication information indicating a terminal device to select the primary frequency domain resource or the non-primary frequency domain resource in response to determining that the first parameter and the reference information satisfy the preset condition.

15. A non-transitory computer readable medium storing program codes for use by a terminal device, wherein the program codes comprise instructions for execution by the terminal device to perform operations comprising:

obtaining reference information, wherein the reference information comprises an emergency set or a preset parameter range; and in response to determining that a first parameter and the reference information satisfy a preset condition, selecting a primary frequency domain resource or a non-primary frequency domain resource based on a first probability corresponding to the primary frequency domain resource and a second probability corresponding to the non-primary frequency domain resource, wherein the first parameter comprises a type of an event that triggers random access the preset condition comprises the type of the event that triggers random access belongs to the emergency set, and the first probability is determined to be higher than the second probability when the type of the event that triggers random access belongs to the emergency set.

16. The non-transitory computer readable medium according to claim 15, wherein the primary frequency domain resource and the non-primary frequency domain resource are: (1) an initial bandwidth part and a non-initial bandwidth part; (2) an anchor carrier and a non-anchor carrier; or (3) a first narrowband and a non-first narrowband.

17. The non-transitory computer readable medium according to claim 15, wherein the first parameter comprises a delay requirement of an arrived service, and the preset condition comprises:

the delay requirement of the arrived service falls within the preset parameter range.

18. The non-transitory computer readable medium according to claim 15, wherein the first parameter comprises a priority requirement of an arrived service, and the preset condition comprises:

the priority requirement of the arrived service falls within the preset parameter range.

19. The non-transitory computer readable medium according to claim 15, wherein the emergency set comprises at least one of the following events: initial access from a radio resource control (RRC) idle mode, RRC connection re-establishment, uplink or downlink data arrival during an RRC connected mode when a downlink synchronization status is "non-synchronized", downlink data arrival during the RRC connected mode when there are no physical uplink control channels (PUCCHs) for a scheduling request available, a scheduling request failure, a transition from an RRC inactive mode, downlink data arrival when an uplink synchronization status is "non-synchronized", synchronous reconfiguration, establishment of time alignment for a secondary timing advance group, a request for other system information, and beam failure recovery.

20. The non-transitory computer readable medium according to claim 15, wherein before the selecting a primary frequency domain resource or a non-primary frequency domain resource based on a first probability and a second probability, to initiate random access, the operations further comprising: obtaining a measurement result of each frequency resource; and determining the first probability and the second probability based on the measurement result.

* * * * *